United States Patent [19]
Kathawala

[11] 3,856,808
[45] Dec. 24, 1974

[54] S-TRIAZOLO (4,3-D)(1,4)BENZOTHIAZEPIN-3(2H)-ONE-7,7-DIOXIDES

[75] Inventor: Faizulla G. Kathawala, West Orange, N.J.

[73] Assignee: Sandoz-Wander, Inc., Hanover, N.J.

[22] Filed: Apr. 2, 1973

[21] Appl. No.: 346,721

[52] U.S. Cl............... 260/308 C, 260/327, 424/269
[51] Int. Cl............................................. C07d 99/10
[58] Field of Search ................................ 260/308 C

[56] References Cited
UNITED STATES PATENTS
3,646,055  2/1972  Hester ............................ 260/308 C
3,717,654  2/1973  Hester ............................ 260/308 C Primary Examiner—Alton D. Rollins
Attorney, Agent, or Firm—Gerald D. Sharkin; Richard E. Vila; Joseph J. Borovian

[57] ABSTRACT

Abstract of the disclosure s-triazolo-[4,3-d][1,4]benzothiazepin-3(2H)-one-7,7-dioxides, e.g. 2-methyl-5,6-dihydro-s-triazolo-[4,3-d][1,4]benzothiazepin-3(2H)-one-7,7-dioxide are useful as minor tranquilizers, anti-convulsants, and sleep-inducers.

9 Claims, No Drawings

S-TRIAZOLO (4,3-D)(1,4)BENZOTHIAZEPIN-3(2H)-ONE-7,7-DIOXIDES

This invention relates to s-triazolo[4,3-d][1,4] benzothiazepin-3(2H)-one-7,7-dioxide derivatives, acid addition salts thereof, intermediates and processes for their preparation and their use as minor tranquilizers, anti-convulsants, and sleep-inducers.

The compounds of this invention may be represented by the following structural formula:

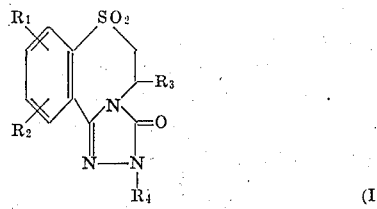

(I)

where
- $R_1$ and $R_2$ each independently represent hydrogen, halo having an atomic weight of 18 to 80 lower alkyl, i.e. alkyl having 1 to 4 carbon atoms, e.g. methyl, ethyl, propyl, isopropyl and the like, nitro or trifluoromethyl, provided that when one of $R_1$ and $R_2$ is nitro or trifluoromethyl, the other is hydrogen, and
- $R_3$ is hydrogen or lower alkyl having 1 to 4 carbon atoms, and
- $R_4$ is hydrogen or lower alkyl having 1 to 4 carbon atoms.

The compounds of formula (I) may be prepared by the following reaction scheme:

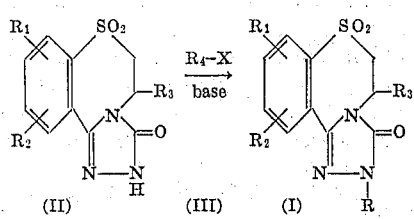

where
X is a leaving group such as chlorine, bromine or o-tosyl, and
$R_1$, $R_2$, $R_3$, $R_4$, and the proviso as defined above.

The compounds of formula (I) are prepared by treating a compound of the formula (II) with a compound of the formula (III) in the presence of an inorganic base such as an alkali metal hydroxide, e.g. sodium hydroxide, potassium hydroxide, or an alkali metal hydride, such as potassium hydride or sodium hydride, the latter being especially preferred. The reaction is carried out in the presence of an inert organic solvent such as the lower alkanols, e.g. methanol, ethanol, and the like, dimethylacetamide, dimethylformamide, or acetonitrile, preferably dimethylacetamide. The temperature of the reaction is not critical, but it is preferred that the reaction be run at temperatures from about 10° to 80°C., more preferably from about 20° to 30°C. The reaction was typically run from about 1 to 8 hours. The compounds of formula (I) are recovered using conventional techniques e.g. crystallization.

The compounds of formula (II) are prepared according to the following reaction scheme:

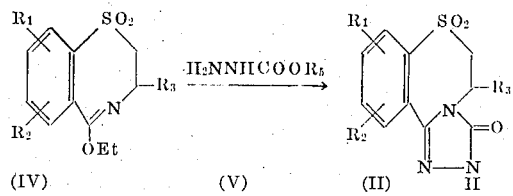

where $R_5$ represents lower alkyl as defined above, and $R_1$, $R_2$, $R_3$, and the proviso as defined above.

The compounds of formula (II) are prepared by treating a compound of the formula (IV) with a compound of the formula (V) in the presence of an inert organic solvent, such as the lower alkanols, methanol, ethanol and the like, tetrahydrofuran, dioxane, glyme or di-glyme, the latter being especially preferred. The temperature of the reaction is not critical, but it is preferred that the reaction be carried out at the reflux temperature of the solvent. The reaction was typically run from about 2 to 24 hours. The compounds of formula (II) are recovered using conventional techniques, e.g. crystallization.

Certain of the compounds of formula (IV) are known and may be prepared by methods disclosed in the literature. The compounds of formula (IV) not specificially disclosed may be prepared by analogous methods from known starting materials.

The compounds of formula (I) possess pharmacological activity. In particular, they possess central nervous system depressant activity, particularly minor tranquilizing and anti-convulsant activity as indicated 1) by their ability to produce docility in behavior tests in mice given 50 to 250 mg/kg i.p. of the test compound according to the 30-word adjective check sheet system, basically as described by S. Irwin, Gordon Research Conference, Medicinal Chemistry, 1959, and Chem., Symposium on Sedative and Hypnotic Drugs, Williams and Wilkins, 1954; 2) by the hexobarbital reinduction method of Winter, J. Pharmacol. and Exp. Therap., 94, 7-11, 1948; and 3) by their ability to inhibit tonic convulsions and death in mice given 50 to 250 mg/kg, i.p. of the test compound followed one hour later by 50 mg/kg i.p. of N-sulfamoylazepine.

The compounds of formula (I) are also useful as sleep inducing agent as indicated in Cebus monkeys using chronically implanted electrodes. Brain readings are obtained via a ten or sixteen channel electroencephalograph.

For the recording sessions, the monkeys are restrained by neck and waist plates in chairs in full side observation cages at the same time every night for thirteen and a half hours Monday through Thursday. Gross behavior is monitored via closed circuit television and video tape recordings.

The compound of formula (I) is administered p.o. immediately on placing the monkey in the observation cages with at least seven days intervening between drug administration. Physiological saline is administered via a similar route and at the same times on all control runs.

Control data are collected at least three days per week and accumulated to give control data for fifteen sessions per monkey Data from each session are statistically compared via computer analysis to the previous 5–15 control sessions for the particular animal, with particular emphasis given to the following phases of the sleep-wakefulness cycle: resting awake, light sleep, deep sleep, paradoxical (REM) sleep, "pseudo-" paradoxical sleep, latency to onset of deep sleep, and latency to onset of first epoch of paradoxical sleep.

For such uses, the compounds of formula (I) may be administered orally or parenterally as such or admixed with conventional pharmaceutical carriers. They may be administered orally in such forms as tablets, dispersible powders, granules, capsules, syrups and elixirs, and parenterally as solutions, e.g., a sterile injectable aqueous solution. The compositions for oral use may contain one or more conventional adjuvants, such as sweetening agents, flavoring agents, coloring agents and preserving agents, in order to provide an elegant and palatable preparation. Tablets may contain the active ingredient in admixture with conventional pharmaceutically acceptable excipients, e.g., inert diluents, such as calcium carbonate, sodium carbonate, lactose, and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and absorption in the gastrointestinal tract and thereby provide a sustained action over a longer period. Similarly, suspensions, syrups, and elixirs may contain the active ingredient in admixture with any of the conventional excipients utilized for the preparation of such compositions, e.g., suspending agents (lecithin, polyoxyethylene stearate and polyoxyethylene sorbitan monoleate) and preservatives (ethyl-p-hydroxybenzoate). Capsules may contain the active ingredient alone or admixed with an inert solid diluent, e.g., calcium carbonate, calcium phosphate and kaolin. The injectable compositions are formulated as known in the art. All these pharmaceutical preparations may contain 1.0 up to about 90 percent typically 5 to 50 percent of the active ingredient in combination with the carrier or adjuvant.

Furthermore, the compounds of formula (I) may be similarly administered in the form of their non-toxic pharmaceutically acceptable acid addition salts. Such salts possess the same order of activity as the free base, are readily prepared by reacting the base with an appropriate acid, and, accordingly, are included within the scope of the invention. Representative of the acid addition salts are the mineral acid salts, such as the hydrochloride, hydrobromide, sulfate and phosphate and the like and the organic acid salts such as succinate, benzoate, acetate, p-toluenesulfonate, benzenesulfonate, and the like.

For the above indicated use as a minor tranquilizer and as an anti-convulsant, the dosage of compound (I) will vary depending upon the mode of administration utilized and the particular compound employed. However, in general, satisfactory results are obtained when the compounds are administered at a daily dosage of from about 4 milligrams to 200 milligrams per kilogram of animal body weight. This daily dosage is preferably given in divided doses, e.g. 2 to 4 times a day or in sustained release form. For most large mammals, the total daily dosage is from about 300 to 3,000 milligrams, and dosage forms suitable for internal administration comprise from about 75 milligrams to about 1,500 milligrams of the compounds in admixture with a solid or liquid pharmaceutical carrier or diluent.

The sleep inducing effective dosage of the compounds of formula (I) will vary depending on the particular compound employed. However, in general, satisfactory results are obtained when the compounds are administered orally at a dosage of from about 2 milligrams to about 100 milligrams per kilogram of animal body weight, typically given in a single dose at bedtime. For most large mammals, the total dosage is from about 150 to about 1,000 milligrams, preferably at bedtime and dosage forms suitable for internal administration comprise from about 75 to about 500 milligrams of the compound in admixture with a solid or liquid pharmaceutical carrier or diluent. The preferred pharmaceutical compositions from the standpoint of preparation and ease of administration are solid compositions, particularly hard-filled capsules and tablets.

Tablets and capsules containing the ingredients below may be prepared by conventional techniques and are useful as sleep inducers at a dose of one or two tablets just before bedtime.

| Ingredients | Weight (mg) tablet | Weight (mg) capsule |
| --- | --- | --- |
| 2-methyl-5,6-dihydro-s-triazolo-[4,3-d][1,4]benzothiazepin-3(2H)-one-7,7-dioxide | 200 | 200 |
| tragacanth | 10 | — |
| lactose | 247.5 | 300 |
| corn starch | 25 | — |
| talcum | 15 | — |
| magnesium stearate | 2.5 | — |
| Total | 500 mg. | 500 mg. |

EXAMPLE 1

5,6-Dihydro-s-triazolo-[4,3-d][1,4]benzothiazepin-3(2H)-one-7,7-dioxide.

A mixture of 2.5 g of 5-ethoxy-2,3-dihydro-1,4-benzothiazepin-1,1-dioxide and 3.6 g methylhydrazinocarboxylate is refluxed in 100 ml diglyme for 8 hours and then stirred at room temperature for 18 hours. The solvent is then removed in vacuo; the resulting residue treated with water, saturated with sodium chloride and extracted several times with ethylacetate. The combined ethylacetate extracts are washed once with water, dried over anhydrous sodium sulfate, filtered and solvent evaporated in vacuo. The resulting residue is crystallized from acetic acid to give 1.0 g of desired 5,6-dihydro-s-triazolo-[4,3-d][1,4]-benzothiazepin-3(2H)-one-7,7-dioxide m.p. 274–277°.

Following the above procedure and using in place of 5-ethoxy-2,3-dihydro-1,4-benzothiazepin-1,1-dioxide an equivalent amount of a. 7-chloro-5-ethoxy-2,3-dihydro-1,4-benzothiazepin-1,1-dioxide, b. 7-methyl-5-ethoxy-2,3-dihydro-1,4-benzothiazepin-1,1-dioxide, c. 7-nitro-5-ethoxy-2,3-dihydro-1,4-benzothiazepin-1,1-dioxide, d. 7-trifluoromethyl-5-ethoxy-2,3-dihydro-1,4-benzothiazepin-1,1-dioxide,
e. 7,8-dichloro-5-ethoxy-2,3-dihydro-1,4-benzothiazepin-1,1-dioxide, or
f. 3-methyl-5-ethoxy-2H-1,4-benzothiazepin-1,1-dioxide, there is obtained
a. 10-chloro-5,6-dihydro-s-triazolo-[4,3-d][1,4]benzothiazepin-3(2H)-one-7,7-dioxide,
b. 10-methyl-5,6-dihydro-s-triazolo-[4,3-d][1,4]benzothiazepin-3(2H)-one-7,7-dioxide,
c. 10-nitro-5,6-dihydro-s-triazolo-[4,3-d][1,4]benzothiazepin-3(2H)-one-7,7-dioxide,
d. 10-trifluoromethyl-5,6-dihydro-s-triazolo-[4,3-d][1,4]benzothiazepin-3(2H)-one-7,7-dioxide,
e. 9,10-dichloro-5,6-dihydro-s-triazolo-[4,3-d][1,4]benzothiazepin-3(2H)-one-7,7-dioxide, or
f. 5-methyl-6H-s-triazolo-[4,3-d][1,4]benzothiazepin-3(2H)-one-7,7-dioxide, respectively.

EXAMPLE II

2-Methyl-5,6-dihydro-s-triazolo-[4,3-d][4,3]benzothiazepin-3(2H)-one-7,7-dioxide.

To a solution of 5.0 gm of 5,6-dihydro-s-triazolo-[4,3-d][1,4]benzothiazepin-3(2H)-one-7,7-dioxide in 50 ml absolute N-N-dimethylformamide, there is added 840 mg of 57% sodium hydride oil dispersion. After stirring the reaction mixture at room temperature for 20 minutes, there is added 3.7 g. of n-methyliodide and the mixture stirred for four hours. The solvent is then removed in vacuo; the resultant residue is treated with water and extracted several times with ethylacetate. The combined ethylacetate extracts are washed twice with saturated sodium chloride, dried over sodium sulfate, filtered and the solvent removed in vacuo. After treating the residue with ethylacetate, the resulting product is crystallized to give 4.0 gm of 2-methyl-5,6-dihydro-s-triazolo-[4,3-d][1,4]benzothiazepin-3(2H)-one-7,7-dioxide m.p. 145°–149°.

Following the above procedure and using in place of 5,6-dihydro-s-triazolo-[4,3-d][1,4]benzothiazepin-3(2H)-one-7,7-dioxide an equivalent amount of
a. 10-chloro-5,6-dihydro-s-triazolo-[4,3-d][1,4]benzothiazepin-3(2H)-one-7,7-dioxide,
b. 10-methyl-5,6-dihydro-s-triazolo-[4,3-d][1,4]benzothiazepin-3(2H)-one-7,7-dioxide,
c. 10-nitro-5,6-dihydro-s-triazolo-[4,3-d][1,4]benzothiazepin-3(2H)-one-7,7-dioxide,
d. 10-trifluoromethyl-5,6-dihydro-s-triazolo-[4,3-d][1,4]benzothiazepin-3(2H)-one-7,7-dioxide,
e. 9,10-dichloro-5,6-dihydro-s-triazolo-[4,3-d][1,4]benzothiazepin-3(2H)-one-7,7-dioxide, or
f. 5-methyl-6H-s-triazolo-[4,3-d][1,4]benzothiazepin-3(2H)-one-7,7-dioxide.

there is obtained
a. 10-chloro-2-methyl-5,6-dihydro-s-triazolo-[4,3-d][1,4]benzothiazepin-3(2H)-one-7,7-dioxide,
b. 2,10-dimethyl-5,6-dihydro-s-triazolo-[4,3-d][1,4]benzothiazepin-3(2H)-one-7,7-dioxide,
c. 2-methyl-10-nitro-5,6-dihydro-s-triazolo-[4,3-d][1,4]benzothiazepin-3(2H)-one-7,7-dioxide,
d. 2-methyl-10-trifluoromethyl-5,6-dihydro-s-triazolo-[4,3-d][1,4]benzothiazepin-3(2H)-one-7,7-dioxide,
e. 9,10-dichloro-2-methyl-5,6-dihydro-s-triazolo-[4,3-d][1,4]benzothiazepin-3(2H)-one-7,7-dioxide, or
f. 2,5-dimethyl-6H-s-triazolo-[4,3-d][1,4]benzothiazepin-3(2H)-one-7,7-dioxide, respectively.

What is claimed is:

1. A compound of the formula

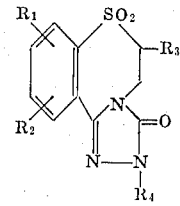

wherein
$R_1$ and $R_2$ each independently represent hydrogen, halo having an atomic weight of 18 to 80, alkyl of 1 to 4 carbon atoms, nitro or trifluoromethyl, provided that when one of $R_1$ and $R_2$ is nitro or trifluoromethyl, the other is hydrogen, and
$R_3$ or alkyl of 1 to 4 carbon atoms, and
$R_4$ is hydrogen or alkyl of 1 to 4 carbon atoms, or a pharmaceutically acceptable acid addition salt thereof.

2. A compound of the formula

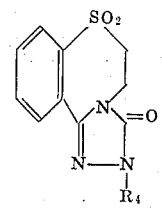

where $R_4$ is defined in claim 1, or a pharmaceutically acceptable acid addition salt thereof.

3. A compound of the formula

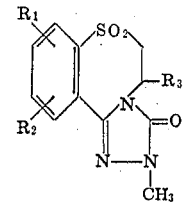

where $R_1$, $R_2$, $R_3$, and the proviso are as defined in claim 1, or a pharmaceutically acceptable acid addition salt thereof.

4. A compound of the formula

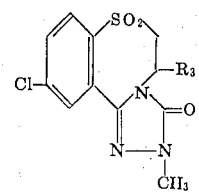

where $R_3$ is as defined in claim 1, or a pharmaceutically acceptable acid addition salt thereof.

5. A compound of the formula

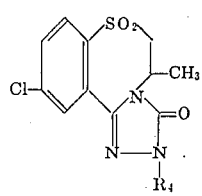

where $R_4$ is as defined in claim 1, or a pharmaceutically acceptable acid addition salt thereof.

6. A compound of the formula

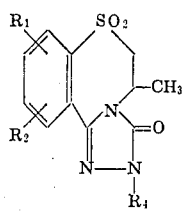

where $R_1$, $R_2$, $R_4$, and the proviso are as defined in claim 1, or a pharmaceutically acceptable acid addition salt thereof.

7. The compound of claim 1 which is 2-methyl-5,6-dihydro-s-triazolo-[4,3-d][1,4]benzothiazepin-3(2H)-one-7,7-dioxide.

8. The compound of claim 1 which is 2-butyl-5,6-dihydro-s-triazolo-[4,3-d][1,4]benzothiazepin-3(2H)-one-7,7-dioxide.

9. A compound of the formula

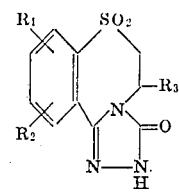

where $R_1$, $R_2$, and $R_3$ are as defined in claim 1.

* * * * *

UNITED STATES PATENT OFFICE
CERTIFICATE OF CORRECTION

Patent No. 3,856,808  Dated December 24, 1974

Inventor(s) FAIZULLA G. KATHAWALA

It is certified that error appears in the above-identified patent and that said Letters Patent are hereby corrected as shown below:

Column 6, line 25, Claim 1; between "$R_3$" and "or" insert --is hydrogen--.

Signed and Sealed this

Eighth Day of February 1977

[SEAL]

Attest:

RUTH C. MASON
Attesting Officer

C. MARSHALL DANN
Commissioner of Patents and Trademarks